(12) United States Patent
Kataoka et al.

(10) Patent No.: US 11,743,351 B2
(45) Date of Patent: Aug. 29, 2023

(54) SERVICE ALLOCATION SELECTION METHOD AND SERVICE ALLOCATION SELECTION PROGRAM

(71) Applicant: Nippon Telegraph and Telephone Corporation, Tokyo (JP)

(72) Inventors: Misao Kataoka, Musashino (JP); Hirofumi Noguchi, Musashino (JP); Takuma Isoda, Musashino (JP); Yoji Yamato, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/429,530

(22) PCT Filed: Feb. 14, 2020

(86) PCT No.: PCT/JP2020/005688
§ 371 (c)(1),
(2) Date: Aug. 9, 2021

(87) PCT Pub. No.: WO2020/170952
PCT Pub. Date: Aug. 27, 2020

(65) Prior Publication Data
US 2022/0109732 A1    Apr. 7, 2022

(30) Foreign Application Priority Data
Feb. 20, 2019   (JP) .................. 2019-028789

(51) Int. Cl.
*H04L 41/0806*    (2022.01)
*H04L 67/51*    (2022.01)
*H04L 67/10*    (2022.01)

(52) U.S. Cl.
CPC .............. *H04L 67/51* (2022.05); *H04L 67/10* (2013.01)

(58) Field of Classification Search
CPC ......... H04L 67/51; H04L 67/10; H04L 67/12; H04L 5/0035; H04L 12/3692; H04L 47/70; G06F 13/00; G06F 13/14
See application file for complete search history.

(56) References Cited

U.S. PATENT DOCUMENTS 10,425,350 B1 * 9/2019 Florissi ................. H04L 47/762
10,637,142 B1 * 4/2020 Tran ..................... H04B 17/318
(Continued)

FOREIGN PATENT DOCUMENTS

JP    2018081515    5/2018

*Primary Examiner* — Michael Won
(74) *Attorney, Agent, or Firm* — Fish & Richardson P.C.

(57) ABSTRACT

When selecting a combination of application software, a computer, and a device in executing various services, even in a situation in which an environment greatly varies, the probability to achieve the purpose of the service is increased to shorten the duration time required to achieve the purpose of the service.

Data effectiveness expectation value $J(x, z)$ regarding a combination of a specific application x and a specific device z on a communication network is calculated, an evaluation value $F(x, y, z)$ including the data effectiveness expectation value and a specific computer y as parameters is calculated, and an appropriate combination $(x, y, z)$ is selected based on the result. The data effectiveness expectation value is calculated from actual record data. The data effectiveness expectation value is calculated by weighting old data and new data. The data effectiveness expectation value is calculated by using actual record values of other applications similar to the specific application x.

17 Claims, 8 Drawing Sheets

(56) References Cited

U.S. PATENT DOCUMENTS

| | | |
|---|---|---|
| 10,719,332 B1* | 7/2020 | Dwivedi .................. G06F 8/65 |
| 10,791,063 B1* | 9/2020 | Florissi ................. H04L 47/783 |
| 2016/0359697 A1* | 12/2016 | Scheib ............... H04L 63/1425 |
| 2017/0006135 A1* | 1/2017 | Siebel .................... G06N 20/20 |
| 2018/0006888 A1* | 1/2018 | Vaughn ............... H04L 41/0826 |
| 2018/0129514 A1* | 5/2018 | Lefevre ............ H04N 21/44218 |
| 2019/0012547 A1* | 1/2019 | Togashi ............... G06V 40/166 |
| 2019/0171438 A1* | 6/2019 | Franchitti .............. G06N 20/00 |
| 2020/0310394 A1* | 10/2020 | Wouhaybi ........... H04L 41/0846 |
| 2020/0367071 A1* | 11/2020 | Hashimoto ........... H04W 24/02 |

* cited by examiner

| APL1 | | | | | | |
|---|---|---|---|---|---|---|
| | APL2 | | | | | |
| | | APL3 | PAST ACTUAL RECORD VALUE OF APPLICABLE APL | PAST EXECUTION TIME CUMULATIVE TOTAL | MACHINE/NW RESOURCE CURRENT | APPLICATION CURRENT VALUE |
| DEVIC | | | PAST ACTUAL RECORD VALUE OF APPLICABLE APL (PAST RESULT AVERAGE VALUE) | PAST EXECUTION TIME CUMULATIVE TOTAL | MACHINE/NW RESOURCE CURRENT USAGE INFORMATION (LATEST EXECUTION DATE) | APPLICATION CURRENT VALUE (LATEST DATA LIST) |
| DEVIC | DEVIC | DEVICE 1 | 60 | 50days12H35m | 2018/12/12 13:00~now | 59,60,50,52,60,58 |
| DEVIC | DEVIC | DEVICE 2 | 50 | 4H31m | 2018/12/4 14:00~14:05 | 24,23,22,43,21,24 |
| | | DEVICE 3 | 30 | 2days13H10m | 2018/10/3 15:00~19:00 | 31,35,47,24,36,35 |

| | DEVICE 1 | DEVICE 2 | DEVICE 3 | DEVICE 4 | DEVICE 5 | DEVICE 6 | DEVICE 7 | DEVICE 8 | DEVICE 9 | DEVICE 10 | CORRELATION VALUE α WITH X |
|---|---|---|---|---|---|---|---|---|---|---|---|
| Z → APPLICABLE APL | – | 1 | 0 | – | – | – | – | 0 | 0 | 1 | 1.000 |
| X → SIMILAR APL | 1 | 1 | 1 | – | – | – | – | 0 | 0 | 0 | 0.167 |
| X2-1 → SIMILAR APL | – | – | – | 0 | 0 | 0 | 1 | 1 | 1 | 0 | −1.000 |
| X2-2 → SIMILAR APL | 0 | 1 | 0 | 0 | – | 1 | 1 | 0 | 0 | 1 | 1.000 |
| X2-3 → SIMILAR APL | 0 | – | – | 0 | 1 | 1 | 0 | 0 | 1 | 1 | 0.500 |
| X2-4 → SIMILAR APL | – | 1 | 0 | – | 1 | 0 | – | 0 | 0 | 0 | 0.612 |
| X2-5 → J2(x, z) | 0.00 | | | 0.00 | 1.00 | 0.67 | 0.50 | | | | |

Fig. 9

SERVICE ALLOCATION SELECTION METHOD AND SERVICE ALLOCATION SELECTION PROGRAM

CROSS-REFERENCE TO RELATED APPLICATIONS

This application is a National Stage application under 35 U.S.C. § 371 of International Application No. PCT/JP2020/005688, having an International Filing Date of Feb. 14, 2020, which claims priority to Japanese Application Serial No. 2019-028789, filed on Feb. 20, 2019. The disclosure of the prior application is considered part of the disclosure of this application, and is incorporated in its entirety into this application.

TECHNICAL FIELD

The present disclosure relates to a service allocation selection method and a service allocation selection program available for providing various services to user terminals or the like on a communication network.

BACKGROUND ART

For example, the live data search system illustrated in FIG. 1 of Patent Literature 1 includes a resource search apparatus, a plurality of servers, a plurality of resources, and a plurality of routers. Here, each of the plurality of resources corresponds to a device capable of outputting live data such as a camera, a microphone, a wearable terminal, or the like. Additionally, the resource search apparatus has a function for providing a predetermined service using the plurality of resources to a user terminal that is communicatively connected.

Additionally, as described in paragraph 0022 of Patent Literature 1, the resource search apparatus allocates a search program on at least one of the plurality of servers when receiving a resource search request from a user terminal. The server collects live data from the resource that is allocated in the same individual network as the server itself according to the search program. The server analyzes the collected live data and transmits an analysis result to the resource search apparatus.

Patent Literature 1 discloses a technology for improving the real-time property of information transmitted to a user terminal that uses a service implemented using resources connected to a plurality of networks. Specifically, the resource search apparatus stores location information of a server located in each of the plurality of networks, acquires a resource search request from the user terminal, and specifies a server responding to the location information included in the acquired resource search request. Additionally, it allocates a search program included in the resource search request on a specified server, collects, from the server on which the search program is allocated, live data that is delivered by a resource that is allocated on the network on which the applicable server is located, searches a resource that delivers live data in which a degree of recognition match of a search target included in the resource search request is greater than or equal to a predetermined value, and transmits access information for the searched resource to the user terminal.

CITATION LIST

Patent Literature

Patent Literature 1: JP 2018-81515 A

SUMMARY OF THE INVENTION

Technical Problem

In a network system such as that disclosed in Patent Literature 1, application software having a search function can be executed by using a plurality of computers such as a server located at various locations on the network, for a request of a user or the like. Additionally, a plurality of devices located at various locations on the network can be utilized as data generation sources.

However, when the distance between the specific computer actually executing the application software and the device used as the data generation source is significantly long, traffic such as a packet passing over the network due to the service increases and the load of the network increases.

Additionally, when, for example, a specific computer in a state in which an operating rate is already high is selected and the target application software is further executed in the computer, the duration time required for the applicable application software to complete the target processing takes longer.

Additionally, for example, when the type or characteristics of information output by a specific device selected from among a plurality of devices is not very effective for executing the target search service, it is highly likely that the purpose of the requested service cannot be achieved although the information obtained from the specific device is analyzed. In that case, after the application is terminated, the selection of the specific device needs to be changed, and the information needs to be acquired and analyzed again. As a result, the duration time required to achieve the purpose of the service is increased, and the load of the communication network and the load of the computer also increase.

Additionally, the types and characteristics of the information output by each of the physical devices connected on the network, are highly likely to vary significantly on a daily basis due to, for example, a difference in a time slot, a difference in the day of the week, a change in position due to the movement of the device itself, or the like. Accordingly, for example, for each purpose of the services, an appropriate device capable of outputting effective data cannot be determined in advance as a specific device.

The present disclosure has been made in view of the circumstances described above, and an object of the present disclosure is to provide, when selecting a combination of application software, a computer, and a device in executing various services, a service allocation selection method and a service allocation selection program that have a high possibility to achieve the purpose of the service and that can be optimized to shorten the duration time required to achieve the purpose of the service, even in a situation in which the environment greatly varies.

Means for Solving the Problem (1) A service allocation selection method, under an environment where at least a plurality of IoT devices capable of outputting data and a plurality of computers capable of executing a plurality of pieces of application software for processing the output data of each of the plurality of IoT devices are individually connected to one another at different positions via a predetermined communication network, for determining, when a piece of new application software is activated as a specific application x, an optimized combination of the specific application x, one specific computer y selected from among the plurality of computers, and one or more specific devices z selected from among the plurality of IoT devices, includes calculating data effectiveness expectation value $J(x, z)$ regarding a combination of the specific application x and a specific device z of the one or more specific devices z, calculating an evaluation value $F(x, y, z)$ including at least the data effectiveness expectation value $J(x, z)$ and the one specific computer y as parameters, and selecting a combination of the specific application x, the one specific computer y, and the specific device z by using the evaluation value $F(x, y, z)$.

According to the service allocation selection method, the data effectiveness expectation value $J(x, z)$ is calculated, a result obtained from evaluating the value is reflected in the selection, and thus, when the service is executed by combining the specific application x and the specific device z, the possibility of achieving the purpose of the service in a short time is increased. Additionally, the possibility of repeatedly changing the specific device z to execute the service is also decreased. Additionally, the specific computer y is also evaluated with the evaluation value $F(x, y, z)$, and thus, for example, by selecting a computer with a small load, it is possible to shorten the time taken until the processing completion of the service.

(2) The service allocation selection method according to (1), in which for each of the plurality of pieces of application software, actual record data representing an applicable service execution result is stored and managed for each of the plurality of IoT devices, and the data effectiveness expectation value $J(x, z)$ is calculated based on the actual record data.

According to the service allocation selection method of (2) above, the actual record data for each IoT device in a service executed in the past is obtained for each application software, and thus it is possible to correctly evaluate the data effectiveness expectation value $J(x, z)$ by using the actual record data in the combination of the specific application x and the specific device z. That is, when the specific application x and the specific device z are combined to execute a service, it can be correctly evaluated whether data output by the specific device z is effective for achieving the purpose of the service based on the actual record data of the past.

(3) The service allocation selection method according to (2), in which first actual record data whose acquisition point of time is old and second actual record data whose acquisition point of time is new are each stored and managed as the actual record data, and the data effectiveness expectation value $J(x, z)$ is calculated by weighting each of the first actual record data and the second actual record data.

According to the service allocation selection method, each of the first actual record data and the second actual record data is weighted to calculate the data effectiveness expectation value $J(x, z)$, and thus it is possible to perform evaluation with a higher level of accuracy. For example, the first actual record data that is old may have a large error due to environmental changes, but can be helpful for correctly calculating the data effectiveness expectation value $J(x, z)$, for example, by averaging or decreasing the weight. Additionally, the second actual record data that is new in terms of time may have a small number of effective data, but is helpful for correctly calculating the data effectiveness expectation value $J(x, z)$ by increasing the weight because the error due to environmental changes is small.

(4) The service allocation selection method according to (2), in which third actual record data detected for a combination of the specific application x and the specific device z and fourth actual record data detected for a combination of a second specific application similar to the specific application x and the specific device z are each acquired as the actual record data, and the data effectiveness expectation value $J(x, z)$ is calculated based on the third actual record data and the fourth actual record data.

According to the service allocation selection method, for example, even when the third actual record data measured for the combination of the specific application x and the specific device z does not exist at all, the second specific application can be extracted in consideration of similarity to the specific application x in the characteristic of the service, and the fourth actual record data can be obtained. Accordingly, the data effectiveness expectation value $J(x, z)$ can be calculated by using the fourth actual record data.

(5) The service allocation selection method according to (1), in which when the specific application x fails to achieve a purpose of a service after the selected specific application x is activated, calculation of the data effectiveness expectation value $J(x, z)$ and calculation of the evaluation value $F(x, y, z)$ are periodically repeated, and the selection of the specific device z is reviewed.

According to the service allocation selection method, it is possible to select the specific device z with a more appropriate combination when the specific application x has been unable to achieve the purpose of the service. For example, it is assumed that the condition in which the data effectiveness expectation value $J(x, z)$ is calculated changes in accordance with the elapse of time or the movement of each device. Accordingly, when a certain time has elapsed, the time required to achieve the purpose of the service can be shortened by reviewing the selection of the specific device z.

(6) The service allocation selection method according to (1), in which a processing time increase amount expectation value $G(x, y, z)$ expected when the specific application x executes a service with a combination of the specific computer y and the specific device z, is calculated based on the data effectiveness expectation value $J(x, z)$, a traffic increase amount expectation value $H(x, y, z)$ expected when the specific application x executes the service with the combination of the specific computer y and the specific device z, is calculated, and the evaluation value $F(x, y, z)$ is calculated by weighting the processing time increase amount expectation value $G(x, y, z)$ and the traffic increase amount expectation value $H(x, y, z)$.

According to the service allocation selection method, it is possible to evaluate the increase amount in the processing time expected based on the data effectiveness expectation value $J(x, z)$. Additionally, the expected increase amount of traffic can be evaluated in consideration of, for example, the length of the distance between the specific computer y in which the specific application x is allocated, and the specific device z. Accordingly, a combination with a small increase amount of the expected processing time and a small increase amount of the expected traffic can be selected by using the evaluation value $F(x, y, z)$.

(7) The service allocation selection method according to (1), in which when the specific application x in the selected combination does not exist on the specific computer y, the specific application x is delivered on the specific computer y from a predetermined server.

According to the service allocation selection method, it is not necessary to allocate various application software on each computer because the specific application x can be delivered on the specific computer y when needed. Accordingly, limited computer resources can be effectively utilized.

(8) A service allocation selection program executable at a predetermined computer, under an environment where at least a plurality of IoT devices capable of outputting data and a plurality of computers capable of executing a plurality of pieces of application software for processing the output data of each of the plurality of IoT devices are individually connected to one another at different positions via a predetermined communication network, for determining, when a piece of new application software is activated as the specific application x, an optimized combination of a specific application x, one specific computer y selected from among the plurality of computers, and one or more specific devices z selected from among the plurality of IoT devices, includes calculating data effectiveness expectation value $J(x, z)$ regarding a combination of the specific application x and a specific device z of the one or more specific devices z, calculating an evaluation value $F(x, y, z)$ including at least the data effectiveness expectation value $J(x, z)$ and the one specific computer y as parameters, and selecting a combination of the specific application x, the one specific computer y, and the specific device z by using the evaluation value $F(x, y, z)$.

When the service allocation selection program is executed by a predetermined computer, the data effectiveness expectation value $J(x, z)$ is calculated, a result obtained from evaluating the value is reflected in the selection, and thus, when the service is executed by combining the specific application x and the specific device z, the possibility of achieving the purpose of the service in a short time is increased. Additionally, the possibility of repeatedly changing the specific device z to execute the service is also decreased. Additionally, the specific computer y is also evaluated with the evaluation value $F(x, y, z)$, and thus, for example, by selecting a computer with a small load, it is possible to shorten the time taken until the processing completion of the service.

Effects of the Invention

According to a service allocation selection method and a service allocation selection program in the present disclosure, when selecting application software, a computer, and a combination of devices in executing various services, it has a high possibility to achieve the purpose of the service even in a situation in which the environment greatly varies, and optimization to shorten the duration time required to achieve the purpose of the service is possible.

BRIEF DESCRIPTION OF DRAWINGS

FIG. 5 is a schematic diagram illustrating a configuration example of an APL usage information DB.

FIG. 9 is a schematic diagram illustrating a configuration example of a table used when acquiring a data effectiveness expectation value by using cooperative filtering.

DESCRIPTION OF EMBODIMENTS

Embodiments of the present disclosure will be described below with reference to the respective drawings.

Configuration Example of Communication System

Figure 1:
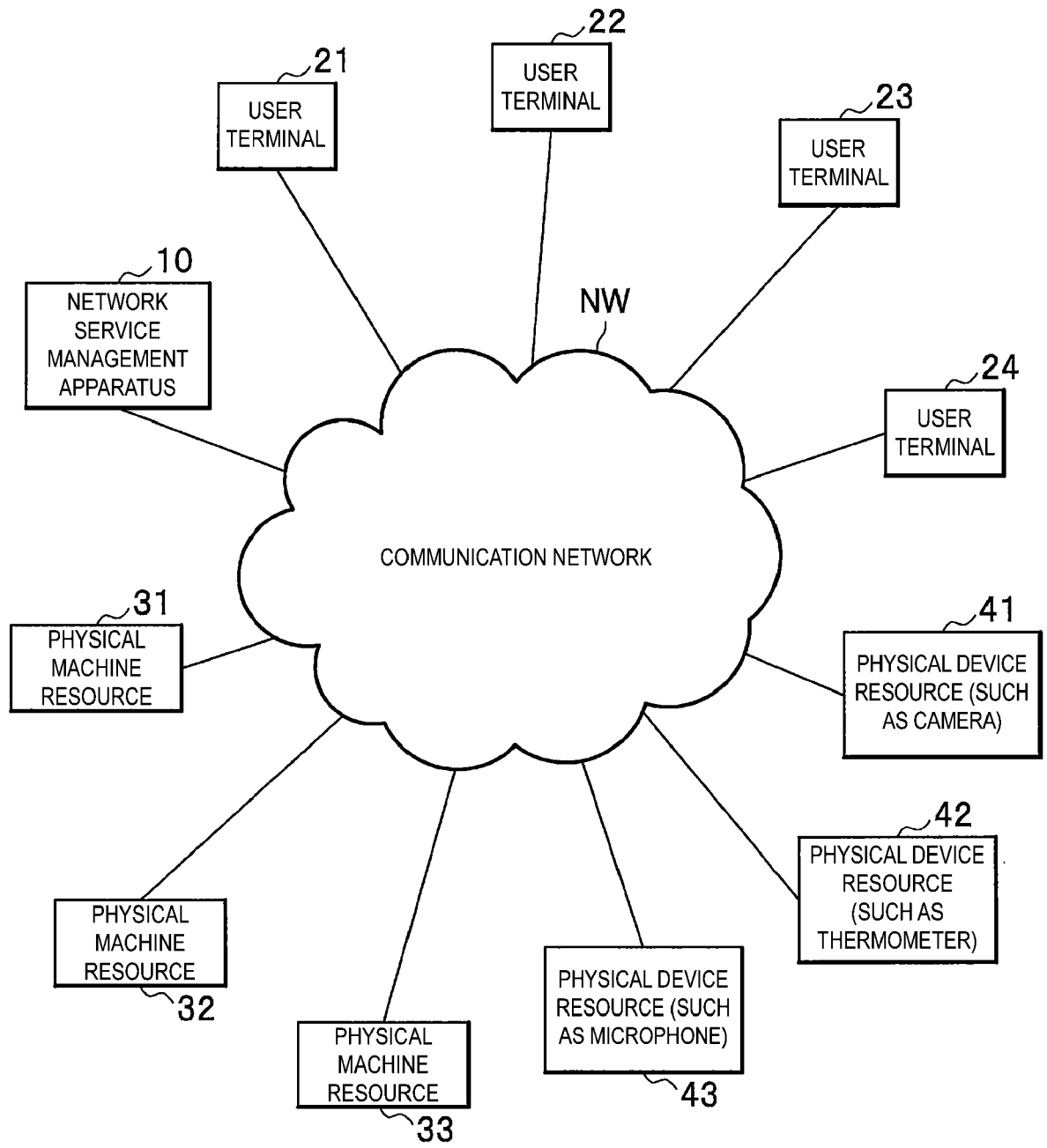
FIG. 1 is a block diagram illustrating a configuration example of a communication system to which the present disclosure is applied.

A configuration example of a communication system to which the present disclosure is applied is illustrated in FIG. 1.

In the example illustrated in FIG. 1, a network service management apparatus 10, a plurality of user terminals 21, 22, 23, and 24, a plurality of physical machine resources 31, 32, and 33, and a plurality of physical device resources 41, 42, and 43 are connected in a communicable state via a communication network NW.

As the communication network NW, for example, the Internet is assumed. Accordingly, the physical device resources 41 to 43 can be utilized as an Internet of Things (IoT) devices capable of transmitting generated data to the Internet.

A user who operates each of the user terminals 21 to 23, or a server of a portal site (not illustrated), can request the implementation of various network services as needed. Specific examples of the assumed network services are as illustrated in (1) to (3) below.

(1) Perform a fashion check of 100 high school girls in a certain location, Tokyo or the like.

(2) Find the whereabouts of a specific lost kitten.

(3) Find a location where cats often live.

A service request from each user or portal site is received by, for example, the network service management apparatus 10, and an applicable network service is executed accordingly. Then, information representing the execution result of the network service is provided to the request source.

Each of the physical machine resources 31 to 33 corresponds to a computer or a server connected to the communication network NW at various locations. That is, each of the physical machine resources 31 to 33 is a physical apparatus capable of providing a computer resource such as a Central Processing Unit (CPU) core, a memory, and a storage as needed.

When the network service mentioned above is executed, it can be realized by executing the application software responding to the applicable service by using any one or a plurality of the physical machine resources 31 to 33 at the same time.

Each of the application software selects each of various types of the physical device resources 41 to 43 allocated in various locations as needed, and acquires and analyzes data from the selected physical device resources 41 to 43. Accordingly, each of the application software can achieve the purpose of the service.

As a specific example of the physical device resource 41, a camera installed in a specific location, a mobile camera mounted on a vehicle or the like, a portable camera owned by various people, or the like is assumed. Additionally, as a specific example of the physical device resource 42, a thermometer installed in a specific location, a mobile thermometer mounted on a vehicle or the like, a portable thermometer owned by various people, or the like is assumed. Additionally, as a specific example of the physical device resource 43, a fixed microphone installed at a specific location, a mobile microphone mounted on a vehicle or the like, a portable microphone owned by various people, or the like is assumed.

Accordingly, when executing a certain network service, the network service management apparatus 10 selects specific application software capable of executing the applicable service. Additionally, the network service management apparatus 10 selects a machine that actually executes the specific application software from the available physical machine resources 31 to 33. Additionally, the network service management apparatus 10 selects a specific device that provides data used by the specific application software from the available physical device resources 41 to 43. Additionally, when the applicable application software does not exist on the selected machine, the network service management apparatus 10 needs to transfer the applicable application software from a predetermined server to the applicable machine and to allocate the application software at the location.

Description of Service Allocation

In an environment such as the communication system illustrated in FIG. 1, when actually executing a network service, a combination (x, y, z) of a specific application software x, a specific machine y in which a computer resource for executing the applicable application software exists, and a specific device z used by the applicable application software, can be variously considered.

However, when the distance between the specific machine y that actually executes the specific application software x and the specific device z used as a data generation source is greatly separated, traffic of packets or the like passing over the communication network NW due to the service increases and the load on the network increases. Accordingly, it is very important to consider the positional relationship between the specific machine y and the specific device z.

Additionally, for example, when selecting a computer resource of a specific machine y in a state in which an operating rate is already high and further executing the specific application software x with the computer resource, the duration time required for the applicable specific application software x to complete the target processing takes longer. Accordingly, it is very important to consider the load or the like of the computer resource on the specific machine y to be selected.

Additionally, when the type or characteristics of information output by the specific device z selected from among a plurality of devices is not very effective for executing the target search service, it is highly likely that the purpose of the requested service cannot be achieved although the information obtained from the specific device z is analyzed. In that case, after the application is terminated, the selection of the specific device z needs to be changed, and the information needs to be acquired and analyzed again. As a result, the duration time required to achieve the purpose of the service is increased, and the load of the communication network NW and the load of the computer also increase. Accordingly, it is very important to consider whether the specific device z to be selected is appropriate.

However, the types and characteristics of the information output by each of the physical device resources 41 to 43 connected on the communication network NW, are highly likely to vary significantly on a daily basis due to, for example, a difference in a time slot, a difference in the day of the week, a change in position due to the movement of the device itself, or the like. Accordingly, for example, for each purpose of the services, an appropriate device capable of outputting effective data cannot be determined in advance as the specific device z.

When, for example, a specific application software x that newly executes a service is to be added on the communication network NW, the network service management apparatus 10 illustrated in FIG. 1 has a function that is useful for optimizing the combination (x, y, z) as a characteristic function. It is assumed that this function will be repeatedly performed as needed or periodically. Additionally, it is assumed that the type and number of application software executed on the communication network NW will be appropriately increased or decreased according to, for example, an increase or decrease in the number of users or an increase or decrease in the load on the network or the like.

Overview of Function of Network Service Management Apparatus

Figure 2:
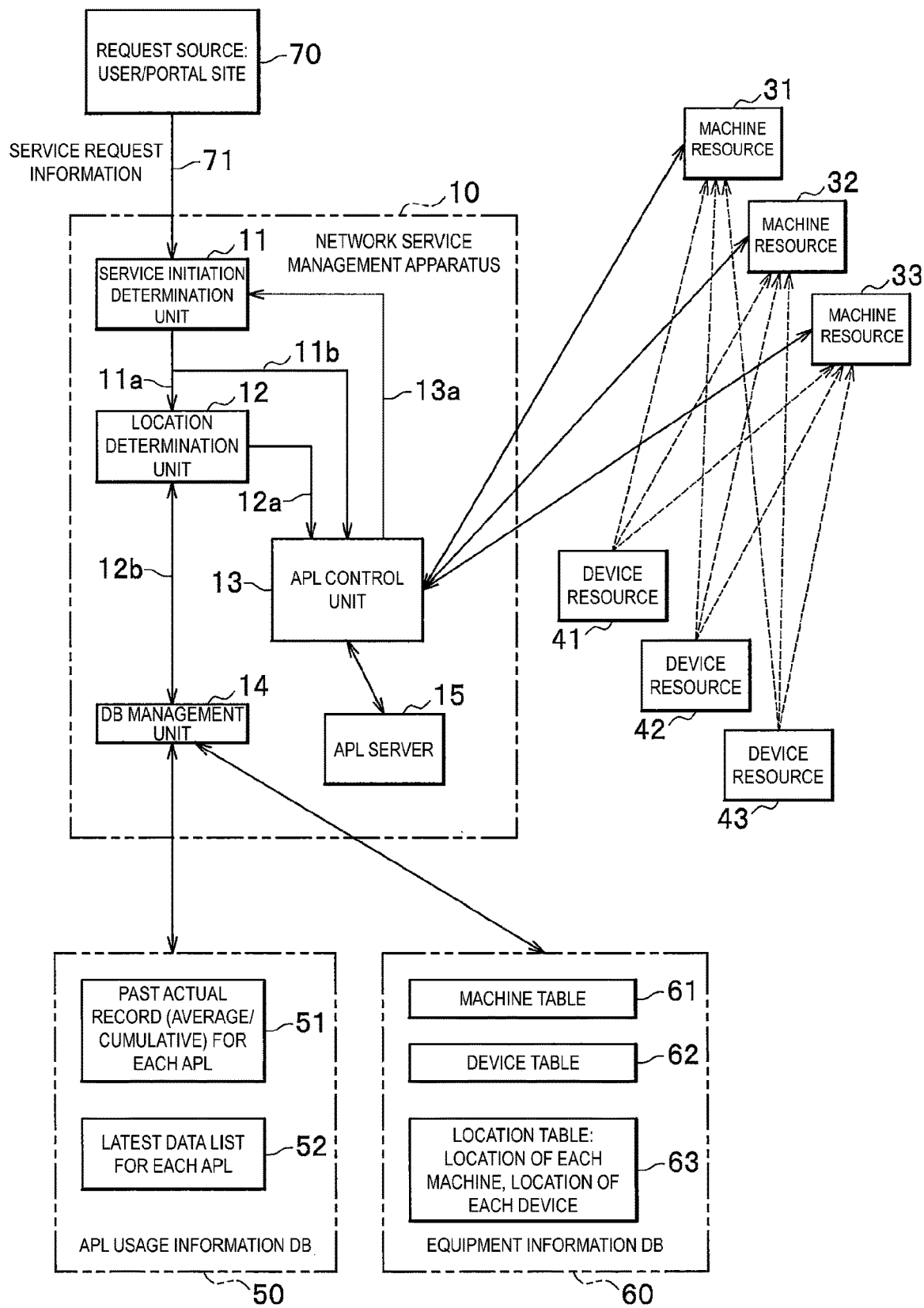
FIG. 2 is a block diagram illustrating an overview of functions of a network service management apparatus that carries out the present disclosure.

FIG. 2 illustrates an overview of functions of the network service management apparatus 10 that carries out the present disclosure.

The network service management apparatus 10 illustrated in FIG. 2 has a service initiation determination unit 11, a location determination unit 12, an APL (application software) control unit 13, a DB (database) management unit 14, and an APL server 15 as main functions.

Each of the above functions is actually realized by executing one or a plurality of management-purpose application software allocated on a predetermined computer. Of course, it is also possible to realize each function with dedicated hardware.

The service initiation determination unit 11 executes determination for the initiation and termination of the service based on service request information 71 input from a service request source 70. Additionally, the service initiation determination unit 11 gives a calculation instruction 11a to the location determination unit 12, and gives a termination instruction 11b to the APL control unit 13.

The DB management unit 14 manages each of the data of an APL usage information DB 50 and equipment information DB 60, which are databases that can be used by the network service management apparatus 10. Additionally, the DB management unit 14 manages to save the history of the operation results of each APL, and collect the information of each machine to update the content of each database.

The location determination unit 12 executes determination for an appropriate location according to the input calculation instruction 11a. That is, a combination with a specific APLx required to execute a target service, a specific machine y selected from the plurality of physical machine resources 31 to 33 having different locations from each other, and a specific device z selected from the plurality of physical device resources 41 to 43 having different locations from each other, is appropriately determined. Additionally, from the viewpoint of determining an appropriate combination, the location determination unit 12 refers to the contents of the APL usage information DB 50 and the equipment information DB 60 via the DB management unit 14. The location determination unit 12 gives location information 12a that specifies the specific machine y and the specific device z of the determined combination, respectively, to the APL control unit 13.

The APL control unit 13 executes management to deliver the specific APLx to the specific machine y on the communication network NW using the APL server 15 as instructed according to the determination of the location determination unit 12, or to execute the specific APLx on the specific machine y.

The APL server 15 holds various information of the APL itself, that is, a combination of various executable programs and data handled by the programs, and delivers the specific APLx to the specific machine y selected according to the instruction of the APL control unit 13.

In the example illustrated in FIG. 2, the APL usage information DB 50 includes past actual record data 51 and a latest data list 52. Additionally, the equipment information DB 60 includes a machine table 61, a device table 62, and a location table 63. The location table 63 contains data representing the location of each machine on the network and the location of each device on the network.

Configuration Example of Machine Table

Figure 3:
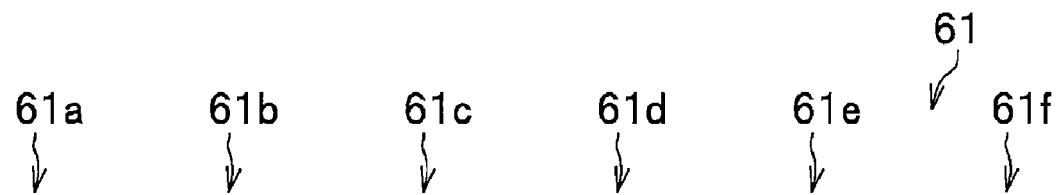
FIG. 3 is a schematic diagram illustrating a configuration example of a machine table.

A configuration example of the machine table 61 is illustrated in FIG. 3.

The machine table 61 illustrated in FIG. 3 has, for each of a plurality of machines, that is, computers, an area holding each of information 61a specifying a machine, a CPU core number 61b, memory capacity information 61c, storage capacity information 61d, CPU usage rate information 61e, and memory usage rate information 61.

Accordingly, by referring to the machine table 61 of FIG. 3, the network service management apparatus 10 can grasp the processing capacity, the CPU and memory usage rates, and the remaining processing capacity of each machine. Additionally, the location information representing the location of each machine, for example, the physical device resources 41 to 43 in FIG. 1, can be acquired from the location table 63 illustrated in FIG. 2.

Configuration Example of Device Table

Figure 4:
FIG. 4 is a schematic diagram illustrating a configuration example of a device table.

A configuration example of the device table 62 is illustrated in FIG. 4.

The device table 62 illustrated in FIG. 4 has an area for each of the plurality of devices, which holds information 62a specifying the device and information 62b representing the type of the device.

Accordingly, by referring to the device table 62 of FIG. 4, the network service management apparatus 10 can grasp the type of data obtained from each device. Additionally, the location information representing the location of each device, for example, the physical device resources 41 to 43 in FIG. 1, can be acquired from the location table 63 illustrated in FIG. 2.

Configuration Example of APL Usage Information DB

A configuration example of the APL usage information DB 50 is illustrated in FIG. 5.

The APL usage information DB 50 illustrated in FIG. 5 includes independent APL tables 50a, 50b, and 50c responding to a first, second, and third application software APL1, APL2, and APL3, respectively.

Each of the APL tables 50a to 50c has an area for each device, which individually holds a past actual record value (first actual record data) 51a of the applicable APL, a past execution time cumulative value 51b, a latest data list of an application current value (second actual record data) 52, and data of resource usage information 53.

The past actual record value 51a and the latest data list 52 of the applicable APL reflect the actual record value obtained as a result of the service when the applicable APL is executed. Additionally, the content of the past actual record value 51a of the applicable APL represents an average value obtained by averaging a large number of past actual record values. Additionally, the content of the latest data list 52 is relatively new data, and represents a list of the actual record values of the service for the recent six times.

It is assumed that an APL managed by the network service management apparatus 10 is a type of service, such as a search service or a service for recognizing and extracting a specific pattern, that allows a service result of whether a certain purpose has been achieved to be obtained. Accordingly, when each service is executed, an actual record value is obtained as a result. Alternatively, it is also conceivable to manage the duration time required from the initiation of the service to the achievement of the purpose as an actual record value.

The past execution time cumulative value 51b represents the cumulative value of the time when the service has been executed in the past by the combination of the applicable APL and the applicable device. For example, in the APL table 50c of FIG. 5, it is illustrated that the service of the combination of the application software APL3 and "device 1" has been only used in the past for a total of "50 days, 12 hours, 35 minutes".

The content of the resource usage information 53 represents the latest execution date and the time slot from the initiation to the termination of execution when the service has been executed in the past with the combination of the applicable APL and the applicable device. That is, the date and time when the service has consumed the resources of the machine and the network by executing the applicable APL can be known from the information.

For example, the APL table 50c of FIG. 5 illustrates that the service of the combination of the application software APL3 and "device 2" has been used only for five minutes from "14:00 to 14:05" on the date of "Dec. 4, 2018". In the APL table 50c of FIG. 5, "Now" of "13:00~Now" illustrated in the content of the resource usage information 53 in the combination of the application software APL3 and "device 1" represents that the applicable service is also currently being executed.

Figure 6:
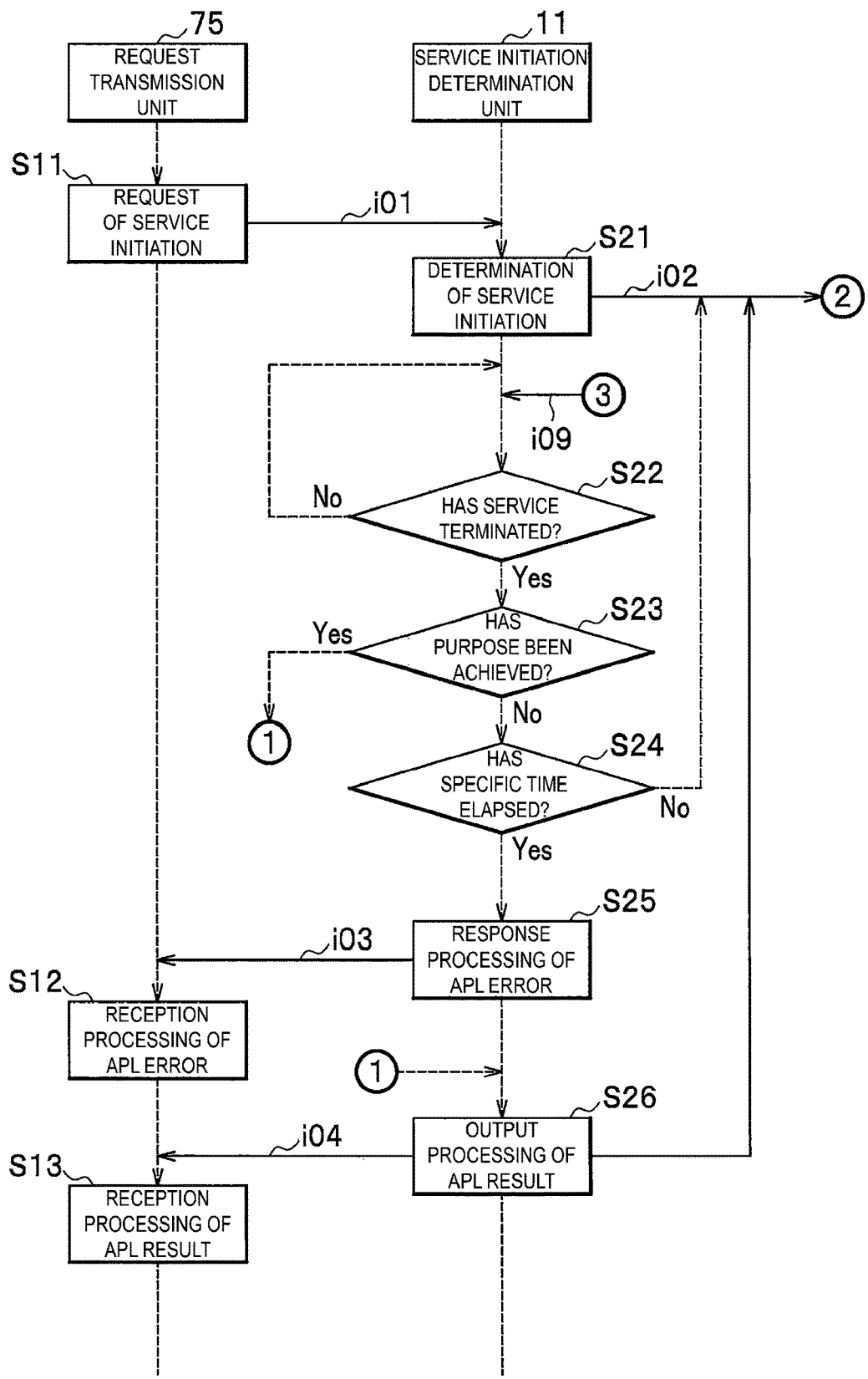
FIG. 6 is a sequence diagram illustrating an overview of operations of a request transmission unit and a service initiation determination unit.
Figure 7:
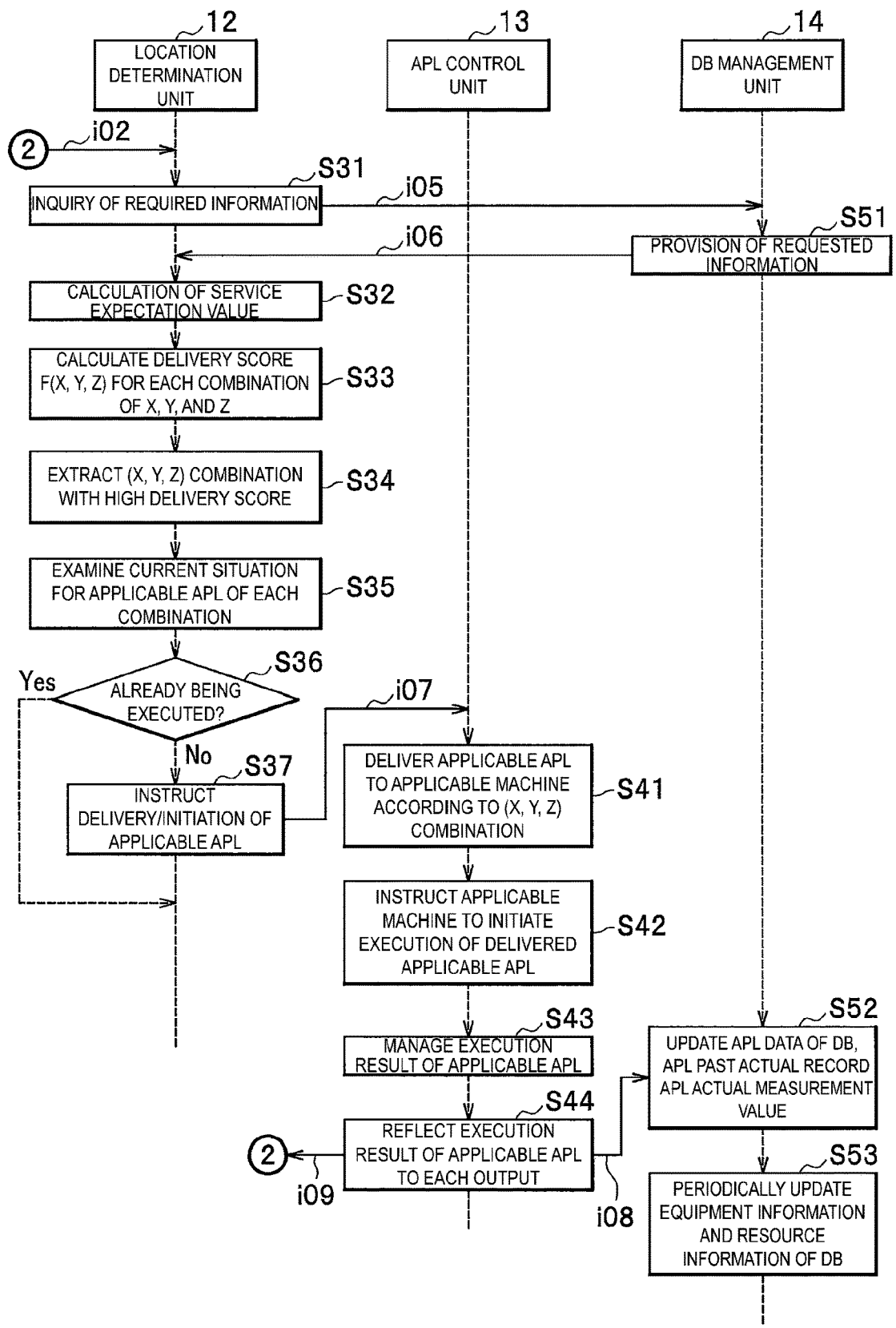
FIG. 7 is a sequence diagram illustrating an overview of operations of a location determination unit, an APL control unit, and a DB management unit.

Overview of operation of network service management apparatus 10 FIG. 6 illustrates the overview of operations of a request transmission unit 75 and the service initiation determination unit 11. The request transmission unit 75 corresponds to the user terminals 21 to 24 and a server that provides a portal site that serve as the service request source 70. Additionally, FIG. 7 illustrates an overview of operations of the location determination unit 12, the APL control unit 13, and the DB management unit 14.

The operations illustrated in FIGS. 6 and 7 will be described below. When the request transmission unit 75 requests the service initiation in a step S11, information i01 is input from the request transmission unit 75 to the service initiation determination unit 11. The service initiation determination unit 11 executes the service initiation determination in a step S21 according to the input information i01. When the service is initiated as a result, the service initiation determination unit 11 sends information i02 to the location determination unit 12.

The location determination unit 12 regards the input information i02 as an instruction to initiate the service, and executes processing after a step S31. In the step S31, the location determination unit 12 sends information i05 to the DB management unit 14, and executes inquiry about the information necessary for determining the location. Specifically, information i31a to i31d below is inquired.

i31a: Applicable content of the equipment information DB 60.

i31b: Resource usage information 53.

i31c: The recent actual record value representing the execution result of another APL, that is, the last content of the latest data list 52.

i31d: The past actual record value 51a of the applicable APL, that is, the average value of the past actual record.

The DB management unit 14 acquires each information inquired in the information i05 from the APL usage information DB 50 and the equipment information DB 60 in a step S51, and returns these as information i06 to the location determination unit 12.

When receiving the result of the inquiry as the information i06, the location determination unit 12 calculates a "service expectation value" in a step S32 based on the acquired information. A specific example of the "service expectation value" will be described later.

From the viewpoint of evaluating each of the combinations (x, y, z) of the applicable specific APLx, each specific machine y for a candidate, and each specific device z for a candidate, the location determination unit 12 calculates a delivery score F(X, y, z) for each combination in a step S33. The delivery score F(x, y, z) includes the "service expectation value" obtained in the step S32 as a parameter. A specific example of the delivery score F(x, y, z) will be described later. Additionally, the location determination unit 12 compares the delivery score F(x, y, z) in a step S34 for each combination obtained in the S33, and selects and extracts some combinations (x, y, z) having high delivery scores F(x, y, z).

The location determination unit 12 examines the current status of the applicable specific APLx in a step S35 for each of some combinations (x, y, z) extracted in the step S34. That is, whether the specific APLx that uses the specific device z is executed on the specific machine y, whether the specific APLx exists on the specific machine y, or the like is identified based on the contents of the APL usage information DB 50 and the equipment information DB 60.

When the specific APLx that uses the specific device z is not yet executed on the specific machine y, the location determination unit 12 proceeds from steps S36 to S37, and instructs the APL control unit 13 to initiate the service of the specific APLx with information i07. Additionally, when the specific APLx does not exist on the specific machine y, the delivery of the specific APLx is also instructed in the step S37.

The APL control unit 13 delivers the applicable specific APLx itself from the APL server 15 to the specific machine y according to the combination (x, y, z) instructed by the received information i07 in a step S41. When the same specific APLx already exists on the specific machine y, the delivery is omitted.

Additionally, the APL control unit 13 instructs the specific machine y to initiate execution of the delivered specific APLx in a step S42.

The APL control unit 13 manages the execution result of the specific APLx in a step S43. That is, information such as an actual record value output by the specific APLx as a result of the service is acquired. Additionally, based on the information output by the specific APLx as the result of the service, the APL control unit 13 instructs the DB management unit 14 with information i08 so that the applicable content of the APL usage information DB 50 is updated in a step S44. Additionally, the APL control unit 13 notifies the service initiation determination unit 11 of the result of the service of the specific APLx by information i09.

The DB management unit 14 updates the contents of the past actual record data 51 and the latest data list 52 of the APL usage information DB 50 in a step S52 according to the received information i08. Additionally, the DB management unit 14 periodically updates the content of the equipment information DB 60 and the content of the resource usage information 53 in a step S53, for example.

On the other hand, the service initiation determination unit 11 waits for the termination of the applicable service (application software) in a step S22 after transmitting the information i02 in the step S21. When the applicable service (application software) is terminated, the information i09 is input from the APL control unit 13, so that the processing of the service initiation determination unit 11 proceeds from the steps S22 to S23 accordingly.

The service initiation determination unit 11 refers to the content of the information i09 in the step S23 and identifies whether the purpose of the service has been achieved. When the purpose of the service is achieved, the process proceeds from the steps S23 to S26.

Additionally, when the purpose of the service is not achieved, the service initiation determination unit 11 identifies whether a specific time has elapsed from the initiation of the service in the next step S24. When a specific time has not elapsed yet, the service initiation determination unit 11 sends the information i02 to the location determination unit 12 again, and instructs the determination of the location, that is, the review of the combination (x, y, z).

Additionally, when a specific time has elapsed from the initiation of the service, the service initiation determination unit 11 proceeds to the step S25 and executes the response processing of an APL error. That is, the service initiation determination unit 11 sends information i03 illustrating the error to the request transmission unit 75, which is the request source of the service.

The service initiation determination unit 11 executes the processing of the output for the result of the service using the applicable APL in the step S26. That is, the service initiation determination unit 11 notifies the request transmission unit 75 of the result with information i04. At the same time, the service initiation determination unit 11 sends the information i02 to the location determination unit 12 again to instruct the service initiation.

In a step S12, the request transmission unit 75 executes the reception processing of the APL error for the received information i03.

In a step S13, the request transmission unit 75 takes in the received information i04 and executes the reception processing regarding the result of the service using the APL.

When the user or the like terminates the service using the specific APLx, the termination instruction is input to the network service management apparatus 10. In that case, the service initiation determination unit 11 in the network service management apparatus 10 determines the termination of the applicable service (application software) and notifies the location determination unit 12 of the result. The location determination unit 12 instructs the APL control unit 13 to terminate the applicable APL according to the notification content of the service initiation determination unit 11. The APL control unit 13 sends an instruction to terminate the applicable APLx to the specific machine y according to the instruction from the location determination unit 12.

Figure 8:
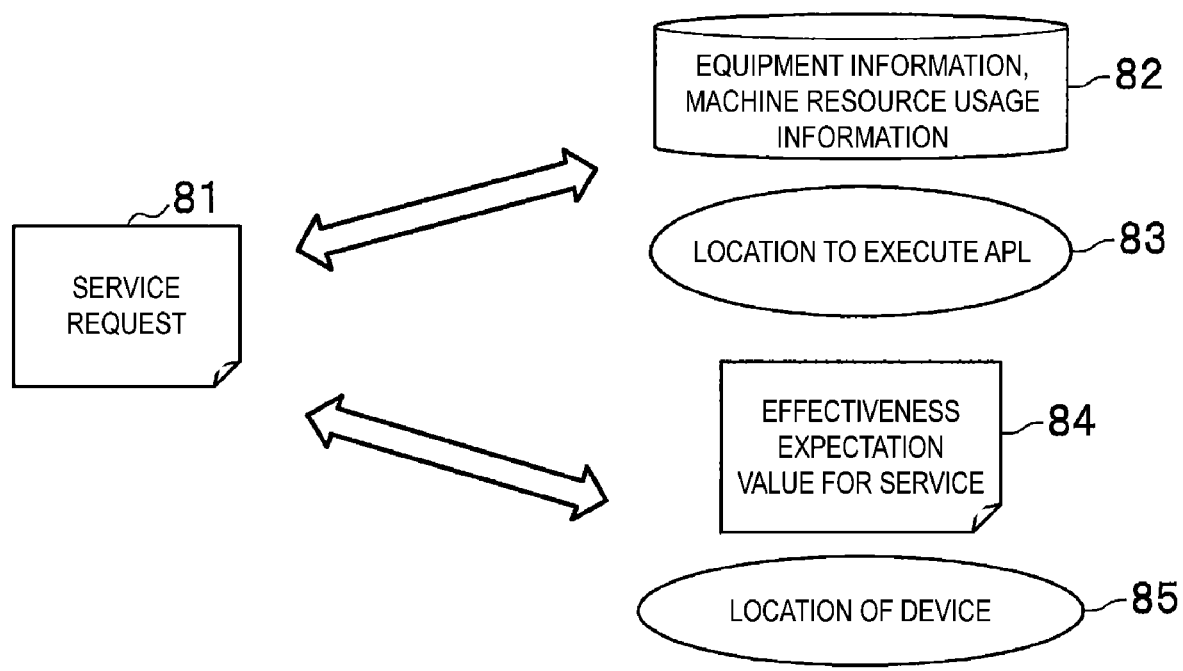
FIG. 8 is a block diagram illustrating elements that influence service allocation selection.

Factors that influence service allocation selection FIG. 8 illustrates the main factors that influence the service allocation selection when the operations illustrated in FIGS. 6 and 7 are executed.

The equipment/machine usage information 82 illustrated in FIG. 8 corresponds to the contents of the machine table 61, the device table 62, and the location table 63 registered in the equipment information DB 60.

That is, when the specific APLx that executes the applicable service is determined according to service request information 81 illustrated in FIG. 8, each of the plurality of combinations (x, y, z) is evaluated. At the time of the evaluation, the position of the machine on which the APLx of the applicable service is executed, that is, execution location information 83 can be specified based on the information of the specific machine y, the machine table 61, and the location table 63. Additionally, device location information 85 can be specified based on the information of the specific device z, the device table 62, and the location table 63.

Additionally, an effectiveness expectation value 84 for the applicable APL of the service can be calculated from the information of the specific APLx and the actual record value that can be acquired from the APL usage information DB 50. That is, the network service management apparatus 10 illustrated in FIG. 2 can select an appropriate combination (x, y, z) by evaluating the execution location information 83, the device location information 85, and the effectiveness expectation value 84 for each of the plurality of candidate combinations (x, y, z). The selection of the appropriate combination (x, y, z) is effective for shortening the average processing time of the APL and reducing the traffic amount of the entire network.

Calculation of Delivery Score F

Specific examples of the "service expectation value" and the delivery score F(x, y, z) in each of the steps S32 and S33 in FIG. 7 will be described below.

The delivery score F(x, y, z) for the combination (x, y, z) can be calculated based on the following Equation (1) to Equation (3).

$$F(x,y,z)=w1 \cdot G(x,y,z)+w2 \cdot H(x,y,z) \quad (1)$$

$$G(x,y,z)=(I(x,y)/J(x,z))+K(x,y,z) \quad (2)$$

$$H(x,y,z)=wi(x,y,z) \cdot N(x,y,z)+wo(x,z) \cdot O(x,y) \quad (3)$$

G(x, y, z): Total service processing time increase amount expectation value.
H(x, y, z): Total traffic increase amount expectation value.
w1, w2: Weights for determining whether to prioritize the service processing time increase amount or the traffic increase amount. For example, it is assumed that the total charge is weighted to be minimized based on the machine usage cost for the service processing time and the communication charge cost for the network traffic usage amount.
I(x, y): Processing time estimation value considering the machine load when processing the specific APLx on the specific machine y.
J(x, z): Data effectiveness expectation value assumed when the specific APLx processes the data of the specific device z. This corresponds to the "service expectation value" in the step S33.
K(x, y, z): Total machine load influence amount due to the specific APLx being allocated on the specific machine y, that is, the difference in load changes.
N(x, y, z): Data traffic amount when transferring data of the specific device z to the specific machine y.
O(x, y): Traffic amount of the output data sent by the specific APLx from the specific machine y to the service request source.
wi(x, y, z), wo(x, z): Weights for the traffic of the input and output for the specific APLx. For example, it is assumed that an adjustment is made such that as the number of hops on the network increases, the weights wi and wo are increased so that the distance on the network become shorter, and an adjustment is made such that as the core network is used, the weights wi and wo are increased so that it is processed as much as possible on the edge side.

Accordingly, a small delivery score F(x, y, z) means that the total service processing time increase amount expectation value G is small and the total traffic increase amount expectation value H is also small, and a high evaluation can be given. That is, a combination (x, y, z) with a small delivery score F(x, y, z) is extracted in the step S34 of FIG. 7.

Actually, for example, in the communication system as illustrated in FIG. 1, it is assumed that in a situation in which some APLs have already been delivered to each machine on the network, another new one of the specific APLx is to be delivered and executed responding to the service request of the user or the like. In that case, the network service management apparatus 10 can appropriately operate the service in the entire network by selecting an appropriate combination (x, y, z) according to the operations illustrated in FIGS. 6 and 7.

Specific Example Regarding Calculation of Each Element of Delivery Score F

I(x, y): Processing Time Estimation Value

In this example, for the sake of simplicity, a case where the following conditions are satisfied is assumed. That is, when the Na number of APLs are allocated on the same machine and executed, the processing time takes longer in proportion to the scale factor of the Na number of APLs. In this case, the processing time estimation value I(x, y) can be obtained by the following Equation (4).

$$I(x,y)=Io \times Na \quad (4)$$

Io: When one APL is executed on the specific machine y, the amount of time to process without being influenced by the load of other APLs. This amount of time can be calculated from the content of the service catalog and the content of the machine table 61 as the processing time information on the specific machine y.

J(x, z): Data Effectiveness Expectation Value

The data effectiveness expectation value J(x, z) can be obtained by the following Equation (5).

$$J(x,z)=w3 \cdot L(x,z) \leqq w4 \cdot M(x,z) \quad (5)$$

M(x, z): Current expectation value (second actual record data and fourth actual record data) at the location of the specific device z and the specific APLx estimated from the service currently in operation other than the specific APLx. For example, when the purpose of the service of the specific APLx is to "check the fashion of high school girls from the camera image", the number of people displayed in the current camera image or the like can be set as the expectation value M(x, z).
L(x, z): Past actual record value (first actual record data and third actual record data) at the locations of the specific device z and the specific APLx.
w3, w4: Weights for each of the current and the past. The sum of the two is set to "1".

Depending on the type of APL, it is assumed that after the data of the same specific device z is analyzed once, the effect is small although the same analysis is continuously performed. In that case, after executing the analysis, by lowering the applicable expectation value M(x, z), the change of the combination (x, y, z) to analyze the data of other devices, that is, a service allocation review, is facilitated.

Each of the above weights w3 and w4 can be calculated by, for example, the following Equation (6) and Equation (7).

$$w3=P1(D1)/(P2(D2)+P1(D1)) \quad (6)$$

$$w4=P2(D2)/(P2(D2)+P1(D1)) \quad (7)$$

P1, P2: Points for D1 and D2
D1: Latest execution date and time
D2: Past cumulative date and time
The points P1 and P2 are defined as follows (1) to (3), for example.
(1) One point will be given for one hour of cumulative time, and the maximum is 100 points.
(2) When it is current information, the maximum of 100 points is given.
(3) When the information is one hour or more ago, 0 point is given.

Accordingly, for example, when the content of the APL table 50c in the APL usage information DB 50 illustrated in FIG. 5 is used, the data effectiveness expectation value J(x, z) for "device 1", "device 2", and "device 3" can be obtained by the following Equation (8) to Equation (10), respectively.

In the case of the "device 1":

$$J(x,z)=\{100/(100+100)\} \times AVE(59,60,50,52,60,58)+ \{100/(100+100)\} \times 60 \quad (8)$$

AVE( ): Average value of data list in parentheses
In the case of the "device 2":

$$J(x,z)=\{58/(58+4)\} \times AVE(24,23,22,43,21,24)+\{4/(58+4)\} \times 50 \quad (9)$$

In the case of the "device 3":

$$J(x,z)=\{0/(0+61)\} \times AVE(31,35,47,24,36,35)+\{61/(0+61)\} \times 30 \quad (10)$$

K(x, y, z): Total Machine Load Influence Amount

In this example, for the sake of simplicity, a case where the following conditions are satisfied is assumed. That is, when the Na number of APLs are allocated on the same machine and executed, the processing time takes longer in proportion to the scale factor of the Na number of APLs. Here, when the combination (x2, y, z2) of the second service and the combination (x3, y, z3) of the third service already exist on the specific machine y, in a case where the service of the specific APLx is added, by this addition, the total number of APLs on the specific machine y changes from 2 to 3, and the processing time estimation value I(x, y) for each APL is increased by 1.5 times, respectively. Accordingly, the total machine load influence amount K(x, y, z) of the case is expressed by the following Equation (11).

$$K(x,y,z)=w1(1.5-1) \cdot ((I2/J2)+(I3/J3)) \quad (11)$$

I2: I(x2, y)
J2: J(x2, z2)
I3: I(x3, y)
J3: J(x3, z3)
x2, x3: Specific APLs of the second and third services
z2, z3: Specific devices for the second and third services Description of Modification Example FIG. 9 illustrates a configuration example of a table used when acquiring a "data effectiveness expectation value" by using cooperative filtering.

The table illustrated in FIG. 9 includes data of the actual record values for the combination of the specific APLx and a plurality of similar APLx2-1, x2-2, . . . , which are similar to the specific APLx, and each of the "device 1" to the "device 10". Additionally, a correlation value α is illustrated in the field on the right side of the table, and the recommendation level J2(x, z) is illustrated in the field on the lower side of the table.

In the table of FIG. 9, for example, effective actual record values are registered for the combination of the specific APLx, and the "device 2" and the "device 3". However, effective actual record values do not exist for the combination of the specific APLx, and the "device 4" to the "device 7".

On the other hand, effective actual record values are registered for the combinations of the similar APLx2-2 to x2-5, and the "device 4" to the "device 7". Additionally, the correlation value α between the specific APLx and the similar APLx2-3 to x2-5 is relatively large. Additionally, the recommendation level J2(x, z) for the "device 5" is very high.

Accordingly, in the situation as illustrated in the table of FIG. 9, when calculating the data effectiveness expectation value J(x, z) for the combination of the specific APLx and the "device 5", instead of the actual record value of the specific APLx, the actual record values of the similar APLx2-3 to x2-5 are adopted. Alternatively, the actual record values of the similar APLx2-3 to x2-5 are also adopted together with the actual record value of the specific APLx. Accordingly, it is highly possible that the appropriate data effectiveness expectation value J(x, z) is obtained.

For example, when the purpose of the service provided by the specific APLx is "to find a specific lost kitten", the actual record value of other similar APLs whose purpose of the service is to "find a place where the cat is often" is adopted, and the data effectiveness expectation value J(x, z) is calculated based on this. As the actual record value in practice, it is assumed that the average value in the past actual record is used.

The service allocation selection program of the present disclosure may be stored in advance on the storage apparatus of the computer constituting the network service management apparatus 10, for example, or may be downloaded from a predetermined server via the communication network NW to be executed by the network service management apparatus 10.

REFERENCE SIGNS LIST

10 Network service management apparatus
11 Service initiation determination unit
12 Location determination unit
13 APL control unit
14 DB management unit
15 APL server
21, 22, 23, 24 User terminal
31, 32, 33 Physical machine resource
41, 42, 43 Physical device resource
50 APL usage information DB
50a, 50b, 50c APL table
51 Past actual record data
52 Latest data list
53 Resource usage information
60 Equipment information DB
61 Machine table
62 Device table
63 Location table
70 Service request source
71, 81 Service request information
75 Request transmission unit
82 Equipment/machine usage information
83 Execution location information
84 Effectiveness expectation value
85 Device location information
NW Communication network

The invention claimed is:

1. A service allocation selection method, under an environment where at least a plurality of IoT devices capable of outputting data and a plurality of computers capable of executing a plurality of pieces of application software for processing the output data of each of the plurality of IoT devices are individually connected to one another at different positions via a predetermined communication network, for determining, when a piece of new application software is activated as a specific application x, an optimized combination of the specific application x, one specific computer y selected from among the plurality of computers, and one or more specific devices z selected from among the plurality of IoT devices, the service allocation selection method comprising:
    calculating data effectiveness expectation value $J(x, z)$ regarding a combination of the specific application x and a specific device z of the one or more specific devices z, wherein the one or more specific devices z comprise a physical sensor configured to collect data from a surrounding environment in which the one or more specific devices z is located;
    calculating a processing time increase amount expectation value $G(x, y, z)$ for the specific application x with a combination with the specific computer y and the specific device z, wherein $G(x, y, z)$ depends on a ratio computed as $I(x,y)/J(x, z)$, wherein $I(x,y)$ is an estimation of processing time for processing the specific application x on the specific computer y while taking into account a computation load of the specific computer y;
    calculating an evaluation value $F(x, y, z)$ including at least the processing time increase amount expectation value $G(x, y, z)$; and
    selecting a combination of the specific application x, the one specific computer y, and the specific device z by using the evaluation value $F(x, y, z)$.

2. The service allocation selection method according to claim 1, wherein
    for each of the plurality of pieces of application software, actual record data representing an applicable service execution result is stored and managed for each of the plurality of IoT devices, and
    the data effectiveness expectation value $J(x, z)$ is calculated based on the actual record data.

3. The service allocation selection method according to claim 2, wherein
    first actual record data whose acquisition point of time is old and second actual record data whose acquisition point of time is new are each stored and managed as the actual record data, and
    the data effectiveness expectation value $J(x, z)$ is calculated by weighting each of the first actual record data and the second actual record data.

4. The service allocation selection method according to claim 2, wherein
    third actual record data detected for a combination of the specific application x and the specific device z and fourth actual record data detected for a combination of a second specific application similar to the specific application x and the specific device z are each acquired as the actual record data, and
    the data effectiveness expectation value $J(x, z)$ is calculated based on the third actual record data and the fourth actual record data.

5. The service allocation method of claim 2, wherein the specific device z is a camera and the actual record data characterizes a number of people displayed in an image captured by the specific device z.

6. The service allocation selection method according to claim 1, wherein
    when the specific application x fails to achieve a purpose of a service after the selected specific application x is activated, calculation of the data effectiveness expectation value $J(x, z)$ and calculation of the evaluation value $F(x, y, z)$ are periodically repeated, and the selection of the specific device z is reviewed.

7. The service allocation selection method according to claim 1, wherein
    a traffic increase amount expectation value $H(x, y, z)$, expected when the specific application x executes the service with the combination of the specific computer y and the specific device z, is calculated, and
    the evaluation value $F(x, y, z)$ is calculated by weighting the processing time increase amount expectation value $G(x, y, z)$ and the traffic increase amount expectation value $H(x, y, z)$.

8. The service allocation selection method according to claim 1, wherein
    when the specific application x in the selected combination does not exist on the specific computer y, the specific application x is delivered onto the specific computer y from a predetermined server.

9. A non-transitory computer readable medium storing a service allocation selection program executable at a predetermined computer, under an environment where at least a plurality of IoT devices capable of outputting data and a plurality of computers capable of executing a plurality of pieces of application software for processing the output data of each of the plurality of IoT devices are individually connected to one another at different positions via a predetermined communication network, for determining, when a piece of new application software is activated as the specific application x, an optimized combination of a specific application x, one specific computer y selected from among the plurality of computers, and one or more specific devices z selected from among the plurality of IoT devices, the service allocation selection program causing the predetermined computer to perform:
    calculating data effectiveness expectation value $J(x, z)$ regarding a combination of the specific application x and a specific device z of the one or more specific devices z, wherein the one or more specific devices z comprise a physical sensor configured to collect data from a surrounding environment in which the one or more specific devices z is located;
    calculating a processing time increase amount expectation value $G(x, y, z)$ for the specific application x with a combination with the specific computer y and the specific device z, wherein $G(x, y, z)$ depends on a ratio computed as $I(x,y)/J(x, z)$, wherein $I(x,y)$ is an estimation of processing time for processing the specific application x on the specific computer y while taking into account a computation load of the specific computer y;
    calculating an evaluation value $F(x, y, z)$ including at least the processing time increase amount expectation value $G(x, y, z)$; and
    selecting a combination of the specific application x, the one specific computer y, and the specific device z by using the evaluation value $F(x, y, z)$.

10. The service allocation method of claim 1, wherein the one or more specific devices z include one or more of: a camera, a thermometer, or a microphone.

11. The service allocation method of claim 10, wherein the one or more of the camera, the thermometer, or the microphone are fixed, mobile, or portable.

12. The non-transitory computer readable medium according to claim 9, wherein
when the specific application x in the selected combination does not exist on the specific computer y, the specific application x is delivered onto the specific computer y from a predetermined server.

13. The non-transitory computer readable medium according to claim 9, wherein
for each of the plurality of pieces of application software, actual record data representing an applicable service execution result is stored and managed for each of the plurality of IoT devices, and
the data effectiveness expectation value $J(x, z)$ is calculated based on the actual record data.

14. The non-transitory computer readable medium according to claim 13, wherein
first actual record data whose acquisition point of time is old and second actual record data whose acquisition point of time is new are each stored and managed as the actual record data, and
the data effectiveness expectation value $J(x, z)$ is calculated by weighting each of the first actual record data and the second actual record data.

15. The non-transitory computer readable medium according to claim 13, wherein
third actual record data detected for a combination of the specific application x and the specific device z and fourth actual record data detected for a combination of a second specific application similar to the specific application x and the specific device z are each acquired as the actual record data, and
the data effectiveness expectation value $J(x, z)$ is calculated based on the third actual record data and the fourth actual record data.

16. The non-transitory computer readable medium according to claim 9, wherein
when the specific application x fails to achieve a purpose of a service after the selected specific application x is activated, calculation of the data effectiveness expectation value $J(x, z)$ and calculation of the evaluation value $F(x, y, z)$ are periodically repeated, and the selection of the specific device z is reviewed.

17. The non-transitory computer readable medium according to claim 9, wherein
a traffic increase amount expectation value $H(x, y, z)$, expected when the specific application x executes the service with the combination of the specific computer y and the specific device z, is calculated, and
the evaluation value $F(x, y, z)$ is calculated by weighting the processing time increase amount expectation value $G(x, y, z)$ and the traffic increase amount expectation value $H(x, y, z)$.

* * * * *